United States Patent
Lu (10) Patent No.: US 8,650,008 B2
(45) Date of Patent: Feb. 11, 2014

(54) METHOD AND SYSTEM OF DEVELOPING CORNER MODELS FOR VARIOUS CLASSES ON NONLINEAR SYSTEMS

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 12/851,044

(22) Filed: Aug. 5, 2010

(65) Prior Publication Data

US 2012/0035892 A1 Feb. 9, 2012

(51) Int. Cl.
*G06F 7/60* (2006.01)
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS 6,023,573 A * 2/2000 Bai et al. ........................... 703/2
6,901,570 B2 5/2005 Lu

* cited by examiner

*Primary Examiner* — Saif Alhija
(74) *Attorney, Agent, or Firm* — Scully, Scott, Murphy & Presser, P.C.; Richard Kotulak, Esq.

(57) ABSTRACT

A method, system and article of manufacture are disclosed for developing corner models for various classes of nonlinear systems. The method comprises the steps of determining whether an explicit relationship between one or more performance targets vs. statistical model parameters is known; and deciding, when an explicit relationship between one or more performance targets vs. statistical model parameters is known, whether the relationship is linear or nonlinear. The relationship is constructed in the fractional form when an explicit relationship between one or more performance targets vs. statistical model parameters is not known. In one embodiment, the invention provides an optimal corner model solution for a single performance target, which varies with statistical parameters nonlinearly. In another embodiment, the invention provides an optimal and common corner model solution for multiple performance targets which vary with statistical model parameters nonlinearly. A step of decreasing the order of a target function on statistical model parameters may be used in the process of generating corner models.

20 Claims, 2 Drawing Sheets

METHOD AND SYSTEM OF DEVELOPING CORNER MODELS FOR VARIOUS CLASSES ON NONLINEAR SYSTEMS

BACKGROUND OF THE INVENTION

1. Field of the Invention

This invention, generally, relates to computer-aided design of electronic circuits, and more specifically, the invention relates to developing corner models for various classes of nonlinear systems.

2. Background Art

Computer aids for electronic circuit designers are becoming more and more popular. Examples of these computer aids include electronic circuit simulators such as the Simulation Program with Integrated Circuit Emphasis (SPICE) developed at the University of California, Berkeley (UC Berkeley), and various enhanced versions or derivatives of SPICE, such as, SPICE2 or SPICE3, HSPICE, PSPICE, and SPECTRE.

An electronic circuit may contain circuit elements such as resistors, capacitors, inductors, mutual inductors, transmission lines, diodes, bipolar junction transistors (BJT), junction field effect transistors (JFET), and metal-on-silicon field effect transistors (MOSFET), etc. A SPICE circuit simulator is a program that simulates the performance of electronic circuits. SPICE solves sets of non-linear differential equations in the frequency domain; steady state and time domain and can simulate the behavior of transistor and gate designs. In SPICE, a circuit is handled in a node/element fashion, i.e., the circuit is regarded as a collection of various elements (transistors, resistors, capacitors, etc.) and the elements are connected at nodes. Thus, each element must be modeled in order to simulate the entire circuit. Most SPICE circuit simulators have built in models for modeling semiconductor devices, and are set up so that the user need only specify model parameter values associated with the models.

Whether it is built-in or plug-in, a device model for a SPICE circuit simulator typically includes model equations and a set of model parameters, which are used to mathematically represent device characteristics of a device element under various bias conditions. For example, for a MOSFET device model, in DC and AC analysis, the inputs of the device model are the drain-to-source, gate-to-source, bulk-to-source voltages, and the device temperature, and the outputs are the various terminal currents. Therefore, the model parameters, along with the model equations in the device model, directly affect the final outcome of the terminal currents.

SPICE models are enabled by Monte Carlo simulation capability. To reduce simulation time, it is desirable to have a corner model. For a set of circuit performance targets that depend on statistical model parameters linearly (e.g., the first-order approximation of targets around an operating point), there exists a set of known corner model solutions (see U.S. Pat. No. 6,901,570 for "Method of Generating Optimum Skew Corners for a Compact Device Model", issued May 31, 2005). For a set of nonlinear systems (in terms of their dependency on statistical model parameters), however, there have not been general and exact corner model solutions other than going to the second-order approximation (quadratic response surface) in the targets vs. statistical model parameter relationship.

BRIEF SUMMARY

A method of an embodiment of the invention includes the steps of determining whether an explicit relationship between one or more performance targets vs. statistical model parameters is known; deciding, when an explicit relationship between one or more performance targets vs. statistical model parameters is known, whether the relationship is linear or nonlinear; and constructing the relationship in the fractional form when an explicit relationship between one or more performance targets vs. statistical model parameters is not known. The method of this embodiment also includes decreasing the order of target functions or cross model equations on a statistical model parameters.

A system of an embodiment of the invention includes one or more processing units configured for: determining whether an explicit relationship between one or more performance targets vs. statistical model parameters is known; deciding, when an explicit relationship between one or more performance targets vs. statistical model parameters is known, whether the relationship is linear or nonlinear; constructing the relationship in the fractional form when an explicit relationship between one or more performance targets vs. statistical model parameters is not known; decreasing the order of target functions or corner model equations on statistical model parameters.

An article of an embodiment of the invention includes: at least one computer usable medium having computer readable program code logic to execute a machine instruction in a processing unit for developing corner models for various classes of nonlinear systems, the computer readable program code logic, when executing, performing the following steps: determining whether an explicit relationship between one or more performance targets vs. statistical model parameters is known; deciding, when an explicit relationship between one or more performance targets vs. statistical model parameters is known, whether the relationship is linear or nonlinear; and constructing the relationship in the fractional form when an explicit relationship between one or more performance targets vs. statistical model parameters is not known.

Further benefits and advantages of this invention will become apparent from a consideration of the following detailed description, given with reference to the accompanying drawings, which specify and show preferred embodiments of the invention.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A method of an embodiment of the invention includes the steps of determining whether an explicit relationship between one or more performance targets vs. statistical model parameters is known; and deciding, when an explicit relationship between one or more performance targets vs. statistical model parameters is known, whether the relationship is linear or nonlinear. The relationship is constructed in the fractional form when an explicit relationship between one or more performance targets vs. statistical model parameters is not known.

In one embodiment, the invention provides an optimal corner model solution for a single performance target, which varies with statistical parameters non-linearly. In another embodiment, the invention provides an optimal and common corner model solution for multiple performance targets which vary with statistical model parameters nonlinearly. In this embodiment, a step of decreasing the order of target functions on statistical model parameters is used in the process of generating corner model.

An embodiment of the invention, further described below in detail, provides a method and system for finding exact and analytic corner model solutions for various classes of nonlinear systems (in terms of the dependency on statistical model parameters). In this method, running Monte Carlo simulations is not required. The corner model of the present invention is accurate when compared with Monte Carlo simulation results, but the generation of the corner model of this invention is very quick (i.e., without actually running Monte Carlo simulations).

Various classes of simple passive device models are targeted. Classes include (i) the resistance of a diffused resistor or a poly resistor (either silicided or unsilicided), (ii) the current through a diffused resistor or a poly resistor, (iii) the impedance of a metal-insulator-metal (MIM) capacitor, (iv) the impedance of any area-perimeter-type of designed or parasitic capacitor, such as a decoupling capacitor or a junction capacitor, (v) the current through a BEOL metal wire, and (vi) the resistance of a BEOL metal wire, etc. These simple device models include nonlinear dependency of the interested performance target on one or more statistical model parameters. Explicit corner solutions or methods are provided.

The method of finding exact and analytic corner model solutions for the above classes of performance targets can be applied to a type of more general target to find the exact corner model solution although numerical method is involved, or to make the task of finding an approximate corner model solution easier.

Some more complex models can be reduced to one of those models after certain approximations around a given nominal operating point. Examples include the gate capacitance of an FET or a MOS varactor, FET saturation current, etc.

Figure 1:
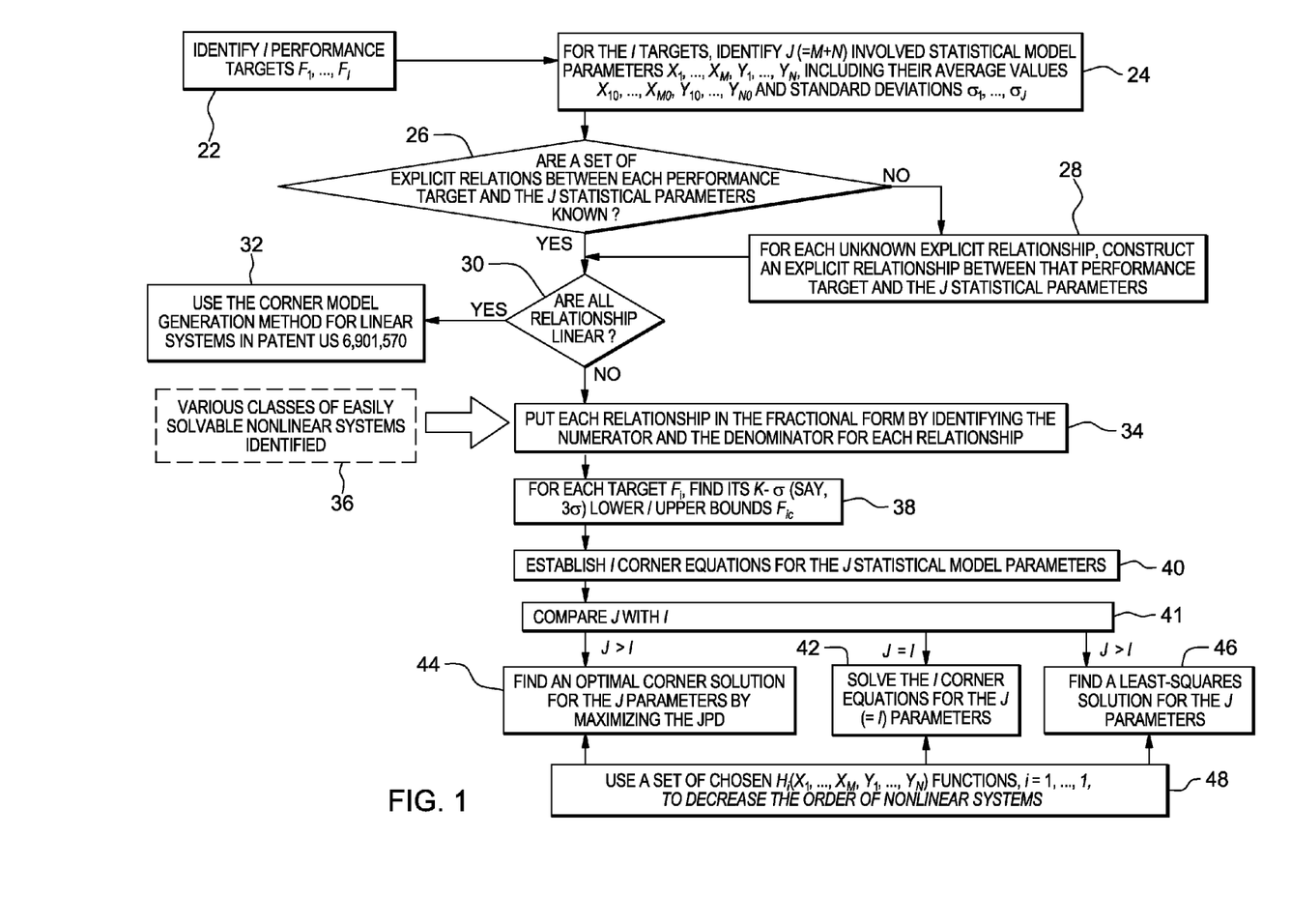
FIG. 1 identifies steps of developing an optimal corner model for one or multiple performance targets which vary with statistical model parameters non-linearly.

FIG. 1 shows an overview of major steps (FIG. 1) used in the method of developing corner models for one or multiple performance targets which vary with statistical model parameters nonlinearly.

The invention, in one embodiment, provides a method of developing an optimal corner model solution for one or multiple performance targets, which vary with statistical parameters non-linearly. An embodiment of the method (applying to multiple performance target case) is shown in FIG. 1 using a flow chart. The steps of the method are discussed below in detail.

Step 22: The first step of the method is to identify one or multiple performance targets, $F_i$, i=1, 2, ..., I, for which one or more corner models are needed.

Step 24: The second step of the method is to identify all statistical model parameters which affect at least one of I performance targets. We label these statistical model parameters as $x_1, x_2, \ldots, x_M, y_1, y_2, \ldots, y_N$, and label their average value (or nominal value) as $x_{10}, x_{20}, \ldots, x_{M0}, y_{10}, y_{20}, \ldots, y_{N0}$, and also label their standard deviation as $\sigma_1$ (for $x_1$), $\sigma_2$ (for $x_2$), ..., $\sigma_M$ (for $x_M$), $\sigma_{M+1}$ (for $y_1$), ..., $\sigma_J$ (for $y_N$), with J=M+N. Often, the distribution of each of $x_1, \ldots, x_M, y_1, \ldots, y_N$ is a Gaussian distribution centered at $x_{10}, x_{20}, \ldots, x_{M0}, y_{10}, y_{20}, \ldots, y_{N0}$, respectively, and with a standard deviation $\sigma_1, \sigma_2, \ldots, \sigma_M, \sigma_{M+1}, \ldots, \sigma_J$, respectively.

Step 26: Then, for each of I performance target, we determine whether an explicit relation between the performance target and the J statistical model parameters exists (or is known).

Step 28: For each unknown explicit relationship, we construct an explicit relationship between that performance target and the J statistical parameters. The construction method includes an interpolation method and/or Spline method, etc.

Step 30: Now, each of I performance targets has an explicit relation with respect to the J statistical model parameters. We next determine whether all I relationships are linear functions of the J statistical model parameters within a k-sigma range (k=3, 4, 5, or 6) of the J statistical model parameters, e.g., within the range of $x_{10}-k\sigma_1 \leq x_1 \leq x_{10}+k\sigma_1, \ldots, x_{M0}-k\sigma_M \leq x_M \leq x_{M0}+k\sigma_M, y_{10}-k\sigma_{M+1} \leq y_1 \leq y_{10}+k\sigma_{M+1}, \ldots, y_{N0}-k\sigma_J \leq y_N \leq y_{N0}+k\sigma_J$.

Step 32: When all I relations are linear functions of the J statistical model parameters within a k-sigma range (k=3, 4, 5, or 6) of the J statistical model parameters, we use the corner model generation method in U.S. Pat. No. 6,901,570.

Step 34: When one or more relations are not linear functions of the J statistical model parameters within a k-sigma range (k=3, 4, 5, or 6) of the J statistical model parameters, we put each relation in the fraction form by identifying the numerator and the denominator for each relationship, $$F_i(x_1, \ldots, x_M, y_1, \ldots, y_N) = \frac{A_i(x_1, \ldots, x_M, y_1, \ldots, y_N)}{B_i(x_1, \ldots, x_M, y_1, \ldots, y_N)}, \quad (0.1)$$

$$i = 1, 2, \ldots, I.$$

Step 36: Identify various classes of easily solvable nonlinear relationship. Some of these classes are detailed below.

Step 38: For each performance target $F_i$, we find its K–σ (K=3, 4, 5, or 6 or other values) lower bound $F_{i,-K}$ and/or its K–σ upper bounds $F_{i,+K}$. Some examples are provided below.

Step 40: The common corner for K–σ maximum (or minimum) performance targets is determined by a set of I equations, $$F_i(x_1, \ldots, x_M, y_1, \ldots, y_N) = F_{ic}, i=1,2,\ldots,I \quad (0.2)$$

where $F_{i,c}$ is either $F_{i,-K}$ or $F_{i,+K}$.

Step 41: Compare the value of J (the number of statistical model parameters) with the value of I (the number of performance targets for which a common corner model is desired).

Step 42: When the number of statistical model parameters J is equal to the number of equations I, instead of solving Eqs. (0.2) directly, we solve the following equations, $$H_i(x_1, \ldots, x_M, y_1, \ldots, y_N) \cdot (F_i - F_{ic}) = 0, i=1,2,\ldots,I \quad (0.3)$$

where(step 48)

$$H_i(x_1, \ldots, x_M, y_1, \ldots, y_N) = B_i(x_1, \ldots, x_M, y_1, \ldots, y_N),$$
$$i=1,2,\ldots,I \quad (0.4)$$

is chosen to decrease the order of the nonlinear equations (0.3). Substituting Eqs. (0.1) and (0.4) into Eqs. (0.3), one gets a new set of I equations, $$A_i(x_1, \ldots, x_M, y_1, \ldots, y_N) = F_{ic} B_i(x_1, \ldots, x_M, y_1, \ldots, y_N), i=1,2,\ldots,I \quad (0.5)$$

We solve this set of I equations.

Step 44: When the number of statistical model parameters J is larger than the number of equations I, often there are many corner solutions. The optimal solution is found by maximizing a joint probability density (JPD). Often, this is equivalent to minimize the following target function, $$T(x_1, \ldots, x_M, y_1, \ldots, y_N, \lambda_1, \ldots, \lambda_I) = \quad (0.6)$$
$$\sum_{j=1}^{M+N} \left(\frac{x_j - x_{j0}}{\sigma_j}\right)^2 - 2\sum_{i=1}^{I} \lambda_i H_i \cdot (F_i - F_{ic}),$$

where (step 48) $H_i$ functions are chosen per Eq. (0.4) to lower the order of the target function T.

Step 46: When the number of unknowns J is smaller than the number of equations I, we use a least-squares method to find an optimal set of corner solution. Specifically, we minimize the following target function, $$S(x_1, \ldots, x_M, y_1, \ldots, y_N) = \sum_{i=1}^{I} [H_i \cdot (F_i - F_{ic})]^2, \quad (0.7)$$

with $H_i$ functions being chosen as in Eq. (0.4) to decrease the order of the target function S (step 48).

In the following we use an example of developing an optimal corner model for a single performance target (i.e., I=1) to further illustrate some of the above steps in details. Note that the single performance target varies with statistical model parameters nonlinearly.

Step 36: One class (1$^{st}$ class) of nonlinear performance target is $$F_1(x_1, \ldots, x_M, y_1, \ldots, y_N) = \frac{A_1}{B_1} = \frac{a_0 + \sum_{j=1}^{M} a_j x_j}{b_0 + \sum_{j=1}^{N} b_j y_j}, \quad (1.1)$$

which depends on (M+N) statistical model parameters, $x_1, x_2, \ldots, x_M, y_1, y_2, \ldots, y_N$. Here M≥0 and N≥1.

The J(=M+N) statistical model parameters can then be written as $$x_j = x_{j0} + \sigma_j g_j, j=1,2,\ldots,M, \quad (1.2a)$$

$$y_j = y_{j0} + \sigma_{M+j} g_{M+j}, j=1,2,\ldots,N, \quad (1.2b)$$

where each of $g_1, \ldots, g_M, g_{M+1}, \ldots, g_{M+N}$ is an independent stochastic/random variable of mean zero and standard deviation one. For the purpose of shortening the length of expressions, and without loss of generality, one can replace the original statistical model parameters $x_1, x_2, \ldots, x_M, y_1, y_2, \ldots, y_N$ by their normalized counterpart, $g_1, \ldots, g_M, g_{M+1},$ $g_{M+N}$. Often, the distribution of each of $g_1, \ldots, g_M$, $g_{M+1}, \ldots, g_{M+N}$ is a Gaussian distribution. In skewing models or corner models, each of $g_1, \ldots, g_M, g_{M+1}, \ldots, g_{M+N}$ is a skewing parameter. Using Eqs. (1.2), the performance target (1.1) can be re-written as $$F_1 = \frac{A_0 + \sum_{j=1}^{M} a_j \sigma_j g_j}{B_0 + \sum_{j=1}^{N} b_j \sigma_{M+j} g_{M+j}}, \quad (1.3)$$

where $$A_0 = a_0 + \sum_{j=1}^{M} a_j x_{j0}, \quad (1.4a)$$

$$B_0 = b_0 + \sum_{j=1}^{N} b_j y_{j0}. \quad (1.4b)$$

Equation (1.3) is a stochastic function defined in a J-dimensional space (J=M+N). The nominal value of $F_1$ is $$F_1(x_{10}, \ldots, x_{M0}, y_{10}, \ldots, y_{N0}) = \frac{A_0}{B_0} \equiv F_{10}. \quad (1.5)$$

Steps 38 and 40: For a given corner value $F_{1c}$ of the performance target $F_1$, corresponding corner solution is found analytically (i.e., efficiently and without iteration). For a given corner value $F_{1c}$ (which can be obtained either analytically or by running Monte Carlo simulations, step 38) of the performance target $F_{1c}$ a corner solution satisfies the equation $$F_1(x_1, \ldots, x_M, y_1, \ldots, y_N) = F_{1c}, \quad (2.1)$$

which is a special case of Eq. (0.2) when I=1.

Step 41: Step 41 in the case of a single performance target leads to step 44.

There are infinite numbers of corner solutions (when M+N≥2) for Eq. (2.1). The optimal corner solution is found by maximizing the joint probability density (JPD) among all corner solutions. The prior-art approach is to minimize a target function, $$T_{prior\text{-}art} = \sum_{j=1}^{M+N} g_j^2 - 2\lambda_1(F_1 - F_{1c}), \quad (2.2a)$$

which is of an infinite order in terms of statistical model parameters $y_1, y_2, \ldots, y_N$, or in terms of $g_{M+1}, \ldots, g_{M+N}$.

$$T_{prior\text{-}art} = \sum_{j=1}^{M+N} g_j^2 - 2\lambda_1 \frac{A_0 + \sum_{j=1}^{M} a_j \sigma_j g_j}{B_0 + \sum_{j=1}^{N} b_j \sigma_{M+j} g_{M+j}} + 2\lambda_1 F_{1c} \quad (2.2b)$$

$$= \sum_{j=1}^{M+N} g_j^2 - \frac{2\lambda_1}{B_0}\left(A_0 + \sum_{j=1}^{M} a_j \sigma_j g_j\right)\left(1 + \sum_{k=1}^{\infty} Z^k\right) + 2\lambda_1 F_{1c},$$

-continued $$Z \equiv -\frac{1}{B_0} \sum_{j=1}^{N} b_j \sigma_{M+j} g_{M+j}.$$

Step 44: The present invention, however, minimizes a different target function—an analysis friendly function, $$T(g_1, \ldots, g_M, g_{M+1}, \ldots, g_{M+N}, \lambda_1) = \sum_{j=1}^{M+N} g_j^2 - 2\lambda_1 H_1(F_1 - F_{1c}), \quad (2.3)$$

which is the result of substituting Eqs. (1.2) into Eq. (0.6).

Step 48: In Eq. (2.3) the function $H_1$ is carefully chosen to make the product $H_1(F_1 - F_{1c})$ a simpler function, i.e., a function with a lower order on the statistical model parameters. Here, we choose $H_1$ to be the function in the denominator of $F_1$, $$H_1 = B_0 + \sum_{j=1}^{N} b_j \sigma_{M+j} g_{M+j}, \quad (2.4)$$

so that $$H_1(F_1 - F_{1c}) = A_0 + \sum_{j=1}^{M} a_j \sigma_j g_j - F_c B_0 - F_c \sum_{j=1}^{N} b_j \sigma_{M+j} g_{M+j}. \quad (2.5)$$

Step 44: Namely, we minimize the following modified target function, $$T(g_1, \ldots, g_M, g_{M+1}, \ldots, g_{M+N}, \lambda_1) = \quad (2.6)$$

$$\sum_{j=1}^{M+N} g_j^2 - 2\lambda_1 \left(\sum_{j=1}^{M} a_j \sigma_j g_j - F_{1c} \sum_{j=1}^{N} b_j \sigma_{M+j} g_{M+j} - d\right),$$

where $$d = F_{1c} B_0 - A_0. \quad (2.7)$$

The target function (2.6) is only quadratic in terms of the statistical model parameters. In other words, we have decreased the order of a target function from a very higher order [see Eq. (2.2b)] to a much lower order [only quadratic in terms of the statistical model parameters; see Eq. (2.6)] by using a careful choice of the function $H_1$.

Continuing step 44: Taking the partial derivative of T with respect to $\lambda_1$, setting it to zero, and using Eq. (1.5), we get $$\sum_{j=1}^{M} a_j \sigma_j g_j - F_{1c} \sum_{j=1}^{N} b_j \sigma_{M+j} g_{M+j} = d, \quad (2.8)$$

which is another form of Eq. (2.1). Taking the partial derivative of T with respect to $g_j$ and then setting each of them to zero, we get $$\frac{\partial T}{\partial g_j} = 2g_j - 2\lambda_1 a_j \sigma_j = 0, \, j = 1, 2, \ldots, M, \quad (2.9)$$

$$\frac{\partial T}{\partial g_{M+j}} = 2g_{M+j} + 2\lambda_1 F_{1c} b_j \sigma_{M+j} = 0, \; j=1,2,\ldots,N. \quad (2.10)$$

From Eq. (2.9), we get $$g_j = \lambda_1 a_j \sigma_j, \; j=1,2,\ldots,M. \quad (2.11)$$

It follows from Eq. (2.10) that $$g_{M+j} = \lambda_1 F_{1c} b_j \sigma_{M+j}, \; j=1,2,\ldots,N. \quad (2.12)$$

Substitute Eqs. (2.11) and (2.12) into Eq. (2.8), we obtain $$\lambda_1 = \frac{d}{\sigma_A^2 + F_c \sigma_B^2}, \quad (2.13)$$

where $$\sigma_A = \sqrt{\sum_{j=1}^{M} a_j^2 \sigma_j^2} \quad (2.14a)$$

is the standard deviation for all the terms in the numerator of Eq. (1.1), and $$\sigma_B = \sqrt{\sum_{j=1}^{N} b_j^2 \sigma_{M+j}^2} \quad (2.14b)$$

is the standard deviation for all the terms in the denominator of Eq. (1.1). Substituting Eq. (2.13) into Eq. (2.11), we get the optimal corner solution for the first M statistical model parameters, $$g_j = \frac{a_j \sigma_j d}{\sigma_A^2 + F_{1c}^2 \sigma_B^2}, \; j=1,2,\ldots,M. \quad (2.15)$$

Similarly, substituting Eq. (2.13) into Eq. (2.12), we get the optimal corner solution for the rest of N statistical model parameters, $$g_{M+j} = -\frac{F_{1c} b_j \sigma_{M+j} d}{\sigma_A^2 + F_c^2 \sigma_B^2}, \; j=1,2,\ldots,N. \quad (2.16)$$

In summary, we have obtained an exact and analytic corner model solution, and the corner is also an optimal (in the sense of the largest JPD) corner. This is the 1$^{st}$ embodiment of the invention.

More on step 38: Find expressions for the lower and upper bounds of the performance targets $F_i$, i=1, 2, . . . , I.

An embodiment of the invention is to find the K-$\sigma$ bounds of the performance targets $F_i$ efficiently (i.e., without running Monte Carlo simulations). Continuing the above discussion for a single performance target, the average value (1$^{st}$ order moment) of the performance function $F_1$ is found to be $$\langle F_1 \rangle = \left\langle \left( A_0 + \sum_{j=1}^{M} a_j \sigma_j g_j \right) \left( B_0 + \sum_{j=1}^{N} b_j \sigma_{M+j} g_{M+j} \right)^{-1} \right\rangle \quad (3.1)$$

$$= F_{10}\left(1 + \frac{\sigma_B^2}{B_0^2} + \frac{3\sigma_B^4}{B_0^4} + \ldots \right).$$

The variance of $F_1$ is found to be $$\sigma_F^2 = \langle F_1^2 \rangle - \langle F_1 \rangle^2 \quad (3.2)$$

$$= F_{10}^2\left(\frac{\sigma_A^2}{A_0^2} + \frac{\sigma_B^2}{B_0^2} + \frac{3\sigma_A^2 \sigma_B^2}{A_0^2 B_0^2} + \frac{8\sigma_B^4}{B_0^4} + \ldots \right).$$

When deriving Eqs. (3.1) and (3.2), we have used the Gaussian distribution for each of $g_1, \ldots, g_M, g_{M+1}, \ldots, g_{M+N}$. The K-$\sigma$ maximum value (K=1, 2, 3, etc.) of $F_1$ can be written as $$F_{1c} = \langle F_1 \rangle + K\sigma_F = F_{1,+K}, \quad (3.3a)$$

and the K-$\sigma$ minimum value (K=1, 2, 3, etc.) of $F_1$ can be regarded as $$F_{1c} = \langle F_1 \rangle - K\sigma_F = F_{1,-K}. \quad (3.3b)$$

Thus, the optimal corners for 3$\sigma$ maximum and minimum performance target are given by Eqs. (2.15), (2.16), (3.3), (3.1), (3.2), (2.14), (1.4), and (1.5) as well as K=3. These expressions are explicit and simple enough to be put into a native SPICE model, a Verilog-A model (i.e., an expanded SPICE model), a process design kit (PDK) software, or a macro model.

More on step 36: Two more classes (2$^{nd}$ and 3$^{rd}$ classes) of analytically solvable performance targets, each of them depends on statistical model parameters nonlinearly:

$$F_1(x_1,\ldots,x_M,y_1,\ldots,y_N) = \frac{A_1}{B_1} = \frac{a_0 + \sum_{j=1}^{M} a_j x_j + \beta x_1^2}{b_0 + \sum_{j=1}^{N} b_j y_j}, \quad (4.1)$$

$$F_1(x_1,\ldots,x_M,y_1,\ldots,y_N) = \frac{A_1}{B_1} = \frac{a_0 + \sum_{j=1}^{M} a_j x_j}{b_0 + \sum_{j=1}^{N} b_j y_j + \gamma y_1^2}. \quad (4.2)$$

In Eqs. (4.1) and (4.2), $a_0, a_1, \ldots, a_M, b_0, b_1, \ldots, b_N, \beta, \gamma$ are constants.

Steps 44 and 48: Performance function (4.1) contains the saturation current of a wide-width FET as a special case (M=N=1, $a_0=b_0=0$). To decrease the order of a corresponding target function T in Eq. (0.6), the $H_1$ function for each of the nonlinear performance functions (4.1) and (4.2) is chosen to be the denominator $B_1$ of that function. Following the same steps given above for a class of nonlinear performance function (1.1), the equation for $\lambda_1$ is found to be a third order algebraic equation [replacing Eq. (2.13)] in each case. There is a standard algebraic method to find $\lambda_1$'s three roots. When there is only one real root, that root is $\lambda_1$'s solution. When all three roots are real, choose the root that is closest to the would-be solution when the quadratic term $(x_1-x_{10})^2$ or $(y_1-y_{10})^2$ were zero. After $\lambda_1$'s solution is found, the corner values of statistical model parameters are found straightforwardly [replacing Eqs. (2.15) and (2.16)]. In summary, we have obtained an exact and analytic corner model solution, and the corner is also an optimal (in the sense of the largest JPD) corner. This is the $2^{nd}$ embodiment of the invention.

More on Step 36: Five more classes ($4^{th}$ to $8^{th}$ classes) of analytically solvable performance targets, each of them depends on statistical model parameters nonlinearly:

$$F_1(x_1, y_1) = \frac{A_1}{B_1} = \frac{a_0 + a_1 x_1 + \beta x_1^2}{b_0 + b_1 y_1 + \gamma y_1^2}; \quad (4.3)$$

$$F_1(x_1, x_2) = a_0 + \sum_{j=1}^{2} (a_j x_j + \beta_j x_j^2); \quad (4.4)$$

$$F_1(y_1, y_2) = \frac{A_1}{B_1} = \frac{1}{b_0 + \sum_{j=1}^{2}(b_j y_j + \gamma_j y_j^2)}; \quad (4.5)$$

$$F_1(x_1, x_2) = a_0 + \beta x_1 x_2; \quad (4.6)$$

This example occurs when a current passes through a BEOL metal wire (when $a_0=0$).

$$F_1(y_1, y_2) = \frac{A_1}{B_1} = \frac{1}{b_0 + \gamma y_1 y_2}. \quad (4.7)$$

This is the case of the resistance of a BEOL metal wire (when $b_0=0$).

Steps 44 and 48: The $H_1$ function for each of the nonlinear functions is the denominator $B_1$ of that function. Following the same steps as outlined above [from Eq. (2.1) to Eq. (2.16)], the equation for $\lambda_1$ is found to be a fourth order algebraic equation [replacing Eq. (2.13)] in each case. There is a standard algebraic method to find $\lambda_1$'s four roots. Choose the root that is closest to the would-be solution when quadratic terms $(x_1-x_{10})^2$ or $(y_1-y_{10})^2\beta$ or $\gamma$ were zero. After $\lambda_1$'s solution is found, the corner model parameters are found straightforwardly [replacing Eqs. (2.15) and (2.16)]. In summary, we have obtained an exact and analytic corner model solution, and the corner is also an optimal (in the sense of the largest JPD) corner. This is the $3^{rd}$ embodiment of the invention.

More on steps 34 and 48: When the denominator $B_1$ is a polynomial, the usage of Eq. (0.4) helps to lower the order of an algebraic equation on $\lambda_1$. After this order lowering, even with the order of the algebraic equation on $\lambda_1$ is higher than 4, numerical methods can be used to find the correct and exact solution of $\lambda_1$. After $\lambda_1$'s solution is found, the corner model parameters are found straightforwardly [replacing Eqs. (2.15) and (2.16)]. Here, we have obtained an exact corner model solution, and the corner is also an optimal (in the sense of the largest JPD) corner. This is the $4^{th}$ embodiment of the invention.

When $B_1$ is not a polynomial, we construct separate quadratic (or higher-order) response surfaces for $A_1$ and $B_1$. Afterward, $B_1$ becomes a polynomial, and the above order-lowering method can be applied to $F_1$ now. Here, we have obtained an approximate corner model solution, and the corner is an optimal (in the sense of the largest JPD) corner. This is the $5^{th}$ embodiment of the invention.

In the following we use another example of developing an optimal and common corner model for multiple performance targets to illustrate some of steps in FIG. 1 in detail. Notice that these multiple performance targets vary with statistical model parameters nonlinearly.

In another embodiment, the invention provides an optimal and common corner model solution for multiple performance targets which vary with statistical model parameters nonlinearly (see FIG. 1). In accordance with this embodiment of the invention, for multiple performance targets, corresponding optimal/common corner solutions can be found analytically (i.e., accurately, efficiently, without any approximation, and without iteration).

Step 36: For several different sets of device size/dimensions ($L_i$, $W_i$, . . . ), we will have several different model equations, $$F_i = \frac{A_i}{B_i} = \frac{a_{i0} + \sum_{j=1}^{M} a_{ij} x_j}{b_{i0} + \sum_{j=1}^{N} b_{ij} y_j} = \frac{A_{i0} + \sum_{j=1}^{M} a_{ij}\sigma_j g_j}{B_{i0} + \sum_{j=1}^{N} b_{ij}\sigma_{M+j} g_{M+j}}, \quad (5.1)$$

$$i = 1, 2, \ldots, I.$$

Step 40: Each device size ($L_i$, $W_i$, . . . ) will have its own $3\sigma$ maximum and minimum values $F_{ic}$. The expressions of $F_{ic}$ are similar to those of $F_c$ given in Eqs. (3.3), (3.1), (3.2), (2.14), (1.4), and (1.5). The common corner for K-$\sigma$ maximum (or minimum) performance targets is determined by Eqs. (0.2).

Step 42: When the number of unknowns J(=M+N) is equal to the number of equations I, Eqs. (0.2) with $F_i$ given in Eqs. (5.1), contain solutions. Eqs. (0.2) with $F_i$ given in Eqs. (5.1), however, are not a set of linear algebraic equations in their present form. Instead of solving Eqs. (0.2), we solve Eqs. (0.3) with $H_i$ given in Eq. (0.4), i.e., with $$H_i = B_{i0} + \sum_{j=1}^{N} b_{ij}\sigma_{M+j} g_{M+j}. \quad (5.2)$$

From Eqs. (0.3), (5.1), and (5.2), we get $$\sum_{j=1}^{M} a_{ij}\sigma_j g_j - F_{ic}\sum_{j=1}^{N} b_{ij}\sigma_{M+j} g_{M+j} = d_i, i = 1, 2, \ldots, I, \quad (5.3)$$

where $$d_i = F_{ic} B_{i0} - A_{i0}, i = 1, 2, \ldots, I. \quad (5.4)$$

Introducing $$a_{ij} = -F_{ic} b_{i,j-M}, i=1,2,\ldots,I, j=M+1,\ldots,M+N, \quad (5.5)$$

we can simplify Eq. (5.3) to $$\sum_{j=1}^{M+N} a_{ij}\sigma_j g_j = d_i, i = 1, 2, \ldots, I. \quad (5.6)$$

Eqs. (5.6) are (M+N) linear algebraic equations for (M+N) unknowns, $g_1$, . . . , $g_M$, $g_{M+1}$, . . . , $g_{M+N}$, and they can be solved straightforwardly. Here, we have obtained a set of exact and analytic corner model solutions, and the corner is a common corner. This is the $6^{th}$ embodiment of the invention.

Step 44: When the number of unknowns J(=M+N) is larger than the number of equations I, often there are many corner solutions. The optimal solution is found by maximizing a joint probability density. This is equivalent to minimize the following target function, $$T(g_1, \ldots, g_M, g_{M+1}, \ldots, g_{M+N}, \lambda_1, \ldots, \lambda_I) = \quad (5.7)$$

$$\sum_{j=1}^{M+N} g_j^2 - 2\sum_{i=1}^{I} \lambda_i H_i \cdot (F_i - F_{ic}) =$$

$$\sum_{j=1}^{M+N} g_j^2 - 2\sum_{i=1}^{I} \lambda_i \left(\sum_{j=1}^{M+N} a_{ij}\sigma_j g_j - d_i\right),$$

which is a special case of Eq. (0.6).

Taking a partial derivative of T with respect to each of $\lambda_i$ and then setting it to zero, we recover Eq. (5.6). Taking a partial derivative of T with respect to each of $g_j$ and then setting it to zero, we get $$\frac{\partial T}{\partial g_j} = 2g_j - 2\sum_{i=1}^{I} \lambda_i a_{ij}\sigma_j = 0, \ j = 1, 2, \ldots, M. \quad (5.8)$$

Equation (5.8) gives $$g_j = \sum_{i=1}^{I} \lambda_i a_{ij}\sigma_j, \ j = 1, 2, \ldots, M. \quad (5.9)$$

Substituting Eq. (5.9) into Eq. (5.6), we get I linear algebraic equations for I unknown $\lambda_1, \ldots, \lambda_I$, $$\sum_{k=1}^{I} c_{ik}\lambda_k = d_i, \ i = 1, 2, \ldots, I, \quad (5.10)$$

where $$c_{ik} = \sum_{j=1}^{M+N} a_{ij}a_{kj}\sigma_j^2, \ i, k = 1, 2, \ldots, I. \quad (5.11)$$

Solving these I linear algebraic equations, we find $\lambda_1, \ldots, \lambda_I$. Substituting $\lambda_1, \ldots, \lambda_I$ back into Eqs. (5.11), we obtain a set of corner model solutions. In this case, we have obtained a set of exact and analytic corner model solutions, and the corner is a common and optimal (in the sense of the largest JPD) corner. This is the 7$^{th}$ embodiment of the invention.

Step 46: When the number of unknowns J(=M+N) is smaller than the number of equations I, we use an inventive least-squares method to find an optimal set of corner solutions. Notice that the prior-art method is to minimize this target function, $$S_{prior-art}(g_1, \ldots, g_M, g_{M+1}, \ldots, g_{M+N}) = \quad (5.12a)$$

$$\sum_{i=1}^{I}(F_i - F_{ic})^2 = \sum_{i=1}^{I} \left(\frac{A_{i0} + \sum_{j=1}^{M} a_{ij}\sigma_j g_j}{B_{i0} + \sum_{j=1}^{N} b_{ij}\sigma_{M+j}g_{M+j}} - F_{ic}\right)^2,$$

which is a very high order function of the statistical model parameters, since one or more statistical model parameters $y_1, y_2, \ldots, y_N$ or $g_{M+1}, \ldots, g_{M+N}$ are in the denominator.

Different from the prior-art method, we minimize the target function (0.7). For performance functions (5.1), the target function (0.7) reduces to this following much simpler form after using Eq. (5.2), $$S(g_1, \ldots, g_M, g_{M+1}, \ldots, g_{M+N}) = \sum_{i=1}^{I}\left(\sum_{j=1}^{M+N} a_{ij}\sigma_j g_j - d_i\right)^2, \quad (5.12b)$$

which is only a quadratic function of statistical model parameters. Once again, this example illustrates that the order of a target function has been decreased from a very high order on the statistical model parameters to a much lower order on the statistical model parameters, due to a careful choice of the functions $H_i$, $i=1, 2, \ldots, I$.

Setting the partial derivatives of S with respect to each of $g_j$ equal to zero, $$\frac{\partial S}{\partial g_j} = 2\sum_{i=1}^{I} a_{ij}\sigma_j\left(\sum_{k=1}^{M+N} a_{ik}\sigma_k g_k - d_i\right) = 0, \quad (5.13)$$

$$j = 1, 2, \ldots, M, M+1, \ldots, M+N,$$

we obtain $$\sum_{k=1}^{M+N} B_{jk}g_k = C_j, \ j = 1, 2, \ldots, M+N, \quad (5.14)$$

where $$B_{jk} = B_{kj} = \sum_{i=1}^{I} a_{ij}a_{ik}\sigma_j\sigma_k, \ j, k = 1, 2, \ldots, M+N, \quad (5.15)$$

$$C_j = \sum_{i=1}^{I} d_i a_{ij}\sigma_j, \ j = 1, 2, \ldots, M+N. \quad (5.16)$$

Equations (5.14) contain (M+N) linear algebraic equations for (M+N) unknowns, $g_1, \ldots, g_M, g_{M+1}, \ldots, g_{M+N}$. Equation (5.14) can be solved straightforwardly, and thus we obtain a set of optimal (i.e., least squares) corner model solutions. Here, we have obtained a set of exact and analytic corner model solutions, and the corner is an optimal (in the sense of least squares) corner. This is the 8$^{th}$ embodiment of the invention.

Figure 2:
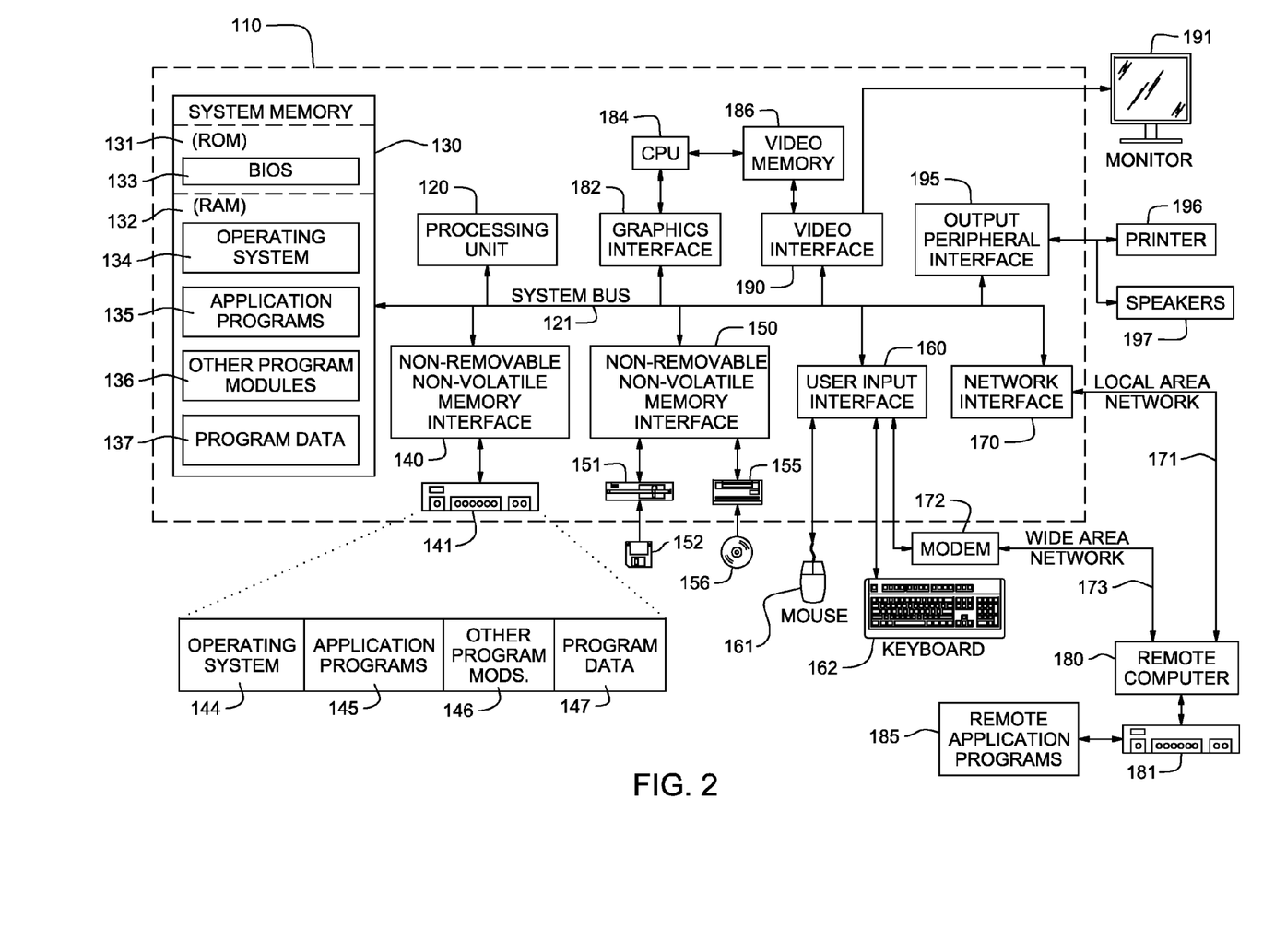
FIG. 2 illustrates a computing environment in which the present invention may be implemented.

For example, FIG. 2 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2, thus, illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, illustrate a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 684 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 691, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, the present invention can be realized in hardware, software, or a combination of hardware and software. Any kind of computer/server system(s)—or other apparatus adapted for carrying out the methods described herein—is suited. Individual steps or functions of the invention may be implemented on a computer or computer system. A typical combination of hardware and software could be a general-purpose computer system with a computer program that, when loaded and executed, carries out the respective methods described herein.

Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of developing a corner model for a nonlinear system, comprising the steps of:
   determining whether an express functional relationship F between at least one-of I performance targets vs. a plurality of statistical model parameters $(x_1, x_2, \ldots, x_m, y_1, y_2 \ldots, y_N)$ is known;
   deciding, when an express functional relationship between said at least one of I performance targets vs. the plurality of statistical model parameters is known, whether the express functional relationship is linear or nonlinear;
   when the express functional relationship between said at least one of I performance targets vs. the plurality of statistical model parameters has a non-linear order, expressing the functional relationship between said at least one of I performance targets vs. the plurality of statistical models as a fraction by identifying a numerator and a denominator for said functional relationship;
   using a set of chosen functions $H_i (x_1, x_2, \ldots, x_m, y_1, y_2 \ldots, y_N)$ i=1, 2, ... I, to decrease the order of the nonlinear functional relationship and to determine a corner model solution for the nonlinear functional relationship; and
   using one or more hardware processing units, implementing a corner model generating program, to perform the steps of identifying a numerator and a denominator for said functional relationship, and using the set of chosen functions $H_i$ to decrease the order of the nonlinear functional relationship.

2. A method according to claim 1, wherein the nonlinear system is for a single performance target, which varies with statistical parameters nonlinearly.

3. A method according to claim 1, wherein the nonlinear system is for multiple performance targets $F_1, F_2, \ldots, F_I$, which vary with statistical model parameters nonlinearly.

4. A method according to claim 1, wherein said fraction $F_i$ expressing the functional relationship between said at least one of the I performance targets, $F_i$ and the plurality of J statistical model parameters $(x_1, x_2, \ldots, x_m, y_1, y_2 \ldots, y_N)$ is of the form, $$F_i(x_1, \ldots, x_M, y_1, \ldots, y_N) = \frac{A_i(x_1, \ldots, x_M, y_1, \ldots, y_N)}{B_i(x_1, \ldots, x_M, y_1, \ldots, y_N)},$$

where $x_1, x_2, \ldots, x_M, y_1, y_2 \ldots, y_N$ are (M+N) independent statistical model parameters, and $A_i$ and $B_i$ are identified functions for each $F_i$.

5. A method of developing corner models for a system which consists of one or more performance targets according to claim 1, comprises a step of determining a K–σ minimum value and a K–σ maximum value for each performance target $F_i$.

6. A method according to claim 1, wherein the numerator of said fraction is a first expanded polynomial, and the denominator of said fraction is a second expanded polynomial.

7. A method according to claim 1, further comprising the step of solving one or more corner equations, $$F_i(x_1, \ldots, x_M, y_1, \ldots, y_N) = F_{ic}, i=1,2,\ldots,I,$$

where $F_i$ is either a K–σ minimum performance target corner or a K–σ maximum performance target corner.

8. A method according to claim 7, comprising the further step of, when there are a plurality of corner solutions, identifying one of the corner solutions as an optimal corner solution according to given criteria, wherein the identifying step includes the step of identifying the one of the corner solutions by maximizing a joint probability density among all of the plurality of corner solutions.

9. A method according to claim 8, wherein the step of maximizing the joint probability density includes the step of minimizing a specified target function T including $F_i$, $F_{ic}$ and $H_i$.

10. A method according to claim 7, wherein the step of finding corner solution includes finding an optimal set of corner solution using a least-square method.

11. A system for developing a corner model for a nonlinear system, comprising:
one or more processing units;
said one or more processing units configured for:
determining whether an express functional relationship F between at least one of I performance targets vs. a plurality of J statistical model parameters ($x_1, x_2, \ldots, x_m$, $y_1, y_2 \ldots, y_N$) is known;
deciding, when an express functional relationship between said at least one of I performance targets vs. the plurality of J statistical model parameters is known, whether the express functional relationship is linear or nonlinear;
when the express functional relationship between said at least one of I performance targets vs. the plurality of J statistical model parameters has a non-linear order, expressing the functional relationship between said at least one of I performance targets vs. the plurality of J statistical models as a fraction by identifying a numerator and a denominator for said functional relationship; and
using a set of chosen functions $H_i$ ($x_1, x_2, \ldots, x_m, y_1, y_2 \ldots, y_N$) i=1, 2 . . . , I, to decrease the order of the non-linear functional relationship and to determine a corner model solution for the nonlinear functional relationship.

12. A system according to claim 11, wherein the nonlinear system is for a single or multiple performance targets $F_1, F_2, \ldots, F_I$, which vary with statistical model parameters nonlinearly.

13. A system according to claim 11, wherein said fraction $F_i$ expressing the functional relationship between said at least one of the I performance targets and the plurality of J statistical model parameters ($x_1, x_2, \ldots, x_m, y_1, y_2 \ldots, y_N$) is of the form, $$F_i(x_1, \ldots, x_M, y_1, \ldots, y_N) = \frac{A_i(x_1, \ldots, x_M, y_1, \ldots, y_N)}{B_i(x_1, \ldots, x_M, y_1, \ldots, y_N)},$$

where $x_1, x_2, \ldots, x_M, y_1, y_2, \ldots, y_N$ are (M+N) independent statistical model parameters, and $A_i$ and $B_i$ are identified functions for each $F_i$.

14. A system according to claim 11, wherein the one or more processing units are further configured for solving one or more corner equations, $$F_i(x_1, \ldots, x_M, y_1, \ldots, y_N) = F_{ic}, i=1,2,\ldots,I,$$

where $F_{ic}$ is either a K–σ minimum performance target corner or a K–σ maximum performance target corner.

15. A system according to claim 14, wherein the one or more processing units are further configured for, when there are a plurality of corner solutions, finding an optimal corner solution by maximizing a joint probability density including minimizing a specified target.

16. An article of manufacture comprising:
at least one non-transitory machine-readable storage medium having computer readable program code logic tangibly embodied therein to execute a machine instruction in a processing unit for developing a corner model for a nonlinear system, the computer readable program code logic, when executing, performing the following steps:
determining whether an express functional relationship F between at least one of I performance targets vs. a plurality of J statistical model parameters ($x_1, x_2, \ldots, x_M$, $y_1, y_2, \ldots, y_N$) is known;
deciding, when an express functional relationship between said at least one of I performance targets vs. a plurality of statistical model parameters is known, whether the express functional relationship is linear or nonlinear;
express functional relationship between said at least one of I performance targets vs. the plurality of J statistical model parameters has a non-linear order, expressing the functional relationship between said at least one of I performance targets vs. the plurality of J statistical models as a fraction by identifying a numerator and a denominator for said functional relationship; and
using a set of chosen functions $H_i$ ($x_1, x_2, \ldots, x_M, y_1, y_2, \ldots, y_N$) i=1, 2, . . . I to decrease the order of the nonlinear system and to determine a corner model solution for the nonlinear system.

17. An article of manufacture according to claim 16, wherein the nonlinear system is for a single or multiple performance targets $F_1, F_2, \ldots, F_I$, which vary with statistical model parameters nonlinearly.

18. An article of manufacture according to claim 16, wherein said fraction $F_i$ expressing the functional relationship between said at least one of the I performance targets and the plurality of J statistical model parameters ($x_1, x_2, \ldots, x_M, y_1, y_2, \ldots, y_N$) is of the form, $$F_i(x_1, \ldots, x_M, y_1, \ldots, y_N) = \frac{A_i(x_1, \ldots, x_M, y_1, \ldots, y_N)}{B_i(x_1, \ldots, x_M, y_1, \ldots, y_N)},$$

where $x_1, x_2, \ldots, x_M, y_1, y_2, \ldots, y_N$ are (M+N) independent statistical model parameters, and $A_i$ and $B_i$ are identified functions for each $F_i$.

19. An article of manufacture according to claim 16, wherein the computer readable program code logic, when executing, performs the further step of solving one or more corner equations, $$F_i(x_1, \ldots, x_M, y_1, \ldots, y_N) = F_{ic}, i=1,2,\ldots,I,$$

where $F_i$ is either a K–σ minimum performance target corner or a K–σ maximum performance target corner.

20. An article of manufacture according to claim 19, wherein the computer readable program code logic, when executing, performs the further step of, when there are a plurality of corner solutions, finding an optimal corner solution by maximizing a joint probability density including minimizing a specified target function.

* * * * *